Dec. 29, 1936. G. SALMONS ET AL 2,066,231
HOOD FITTING FOR MOTOR AND OTHER VEHICLES
Filed Sept. 28, 1935   3 Sheets-Sheet 3
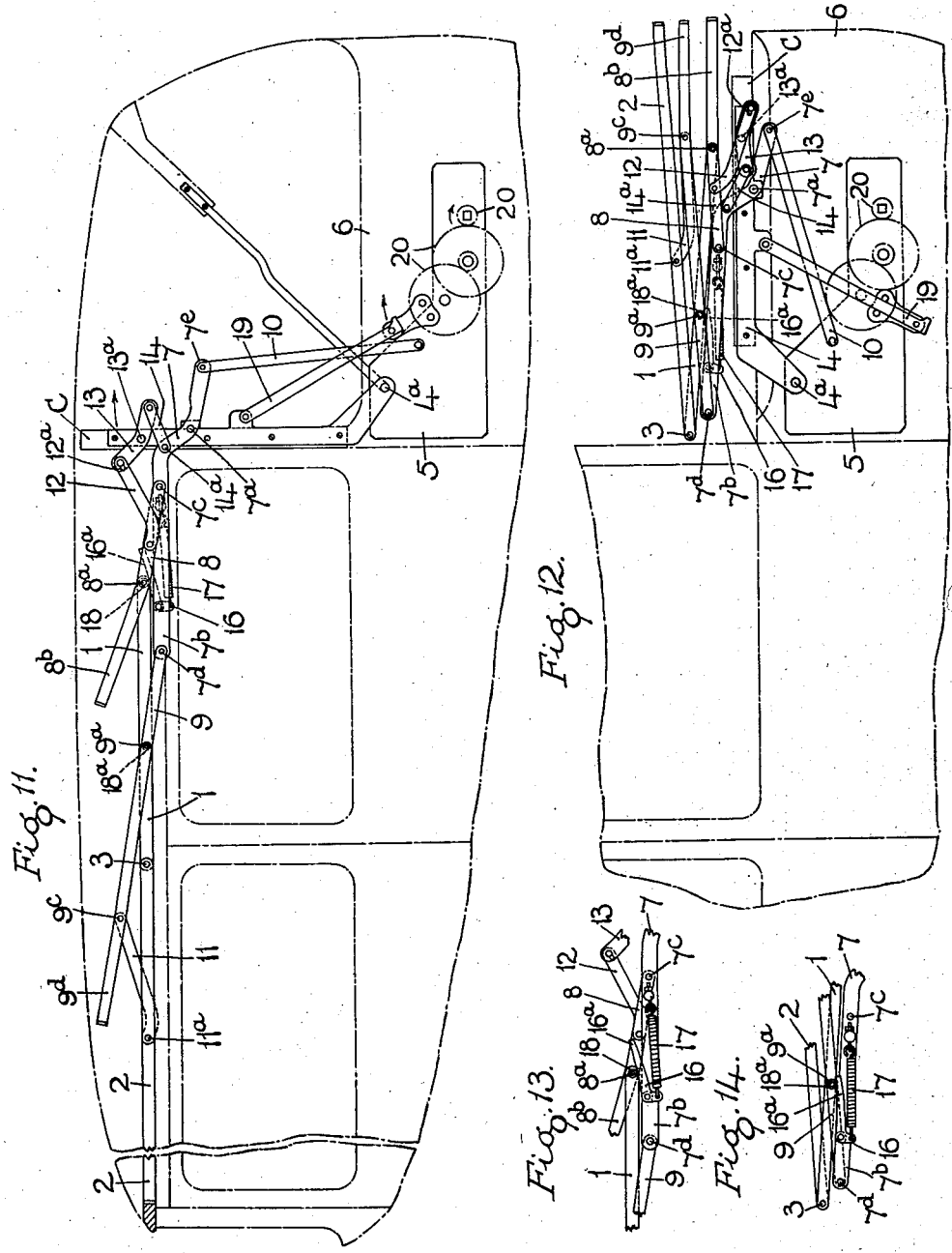
INVENTORS
GEORGE SALMONS
ARTHUR H. DALBY-BALLS
By Norris & Bateman
ATTORNEYS Patented Dec. 29, 1936

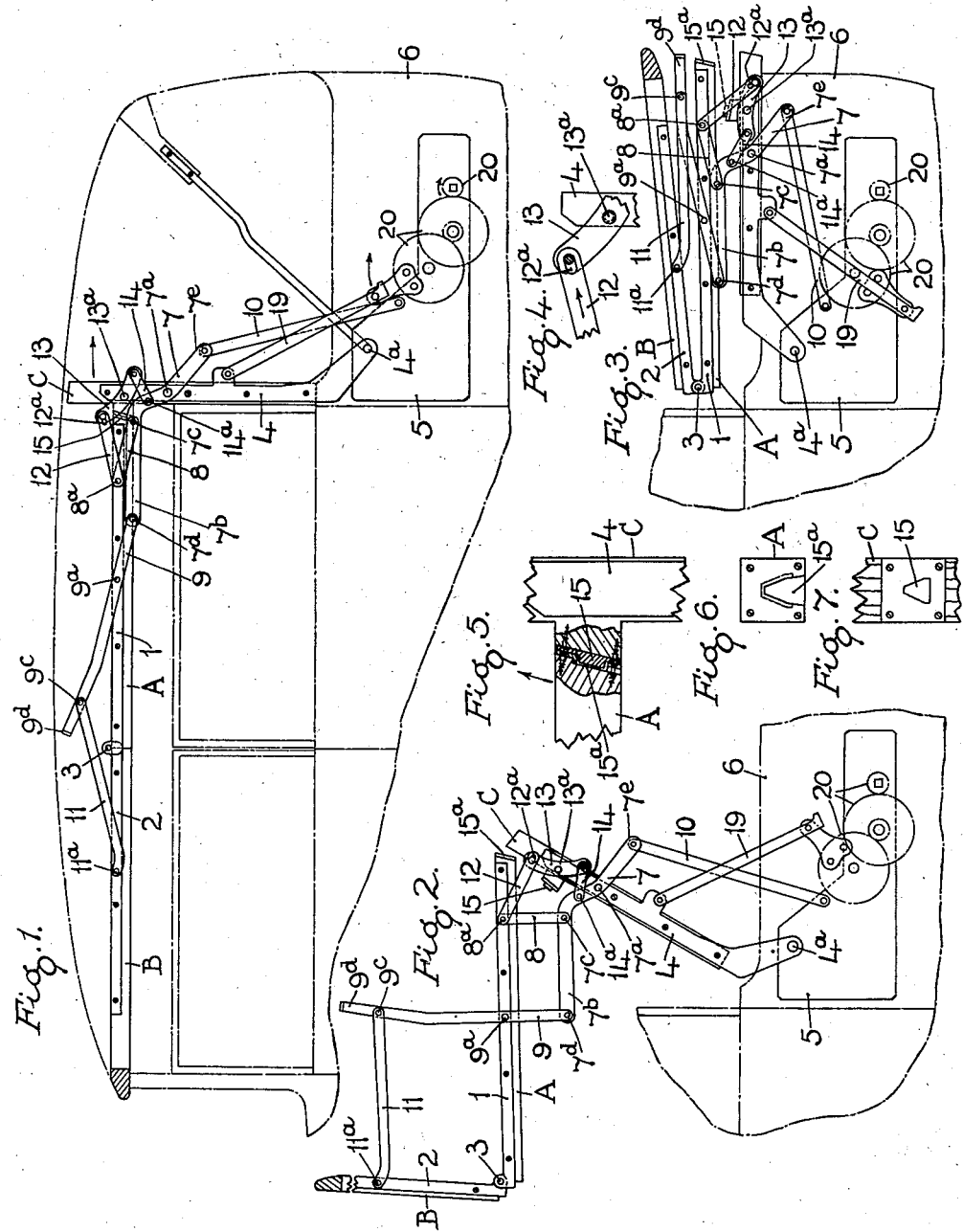

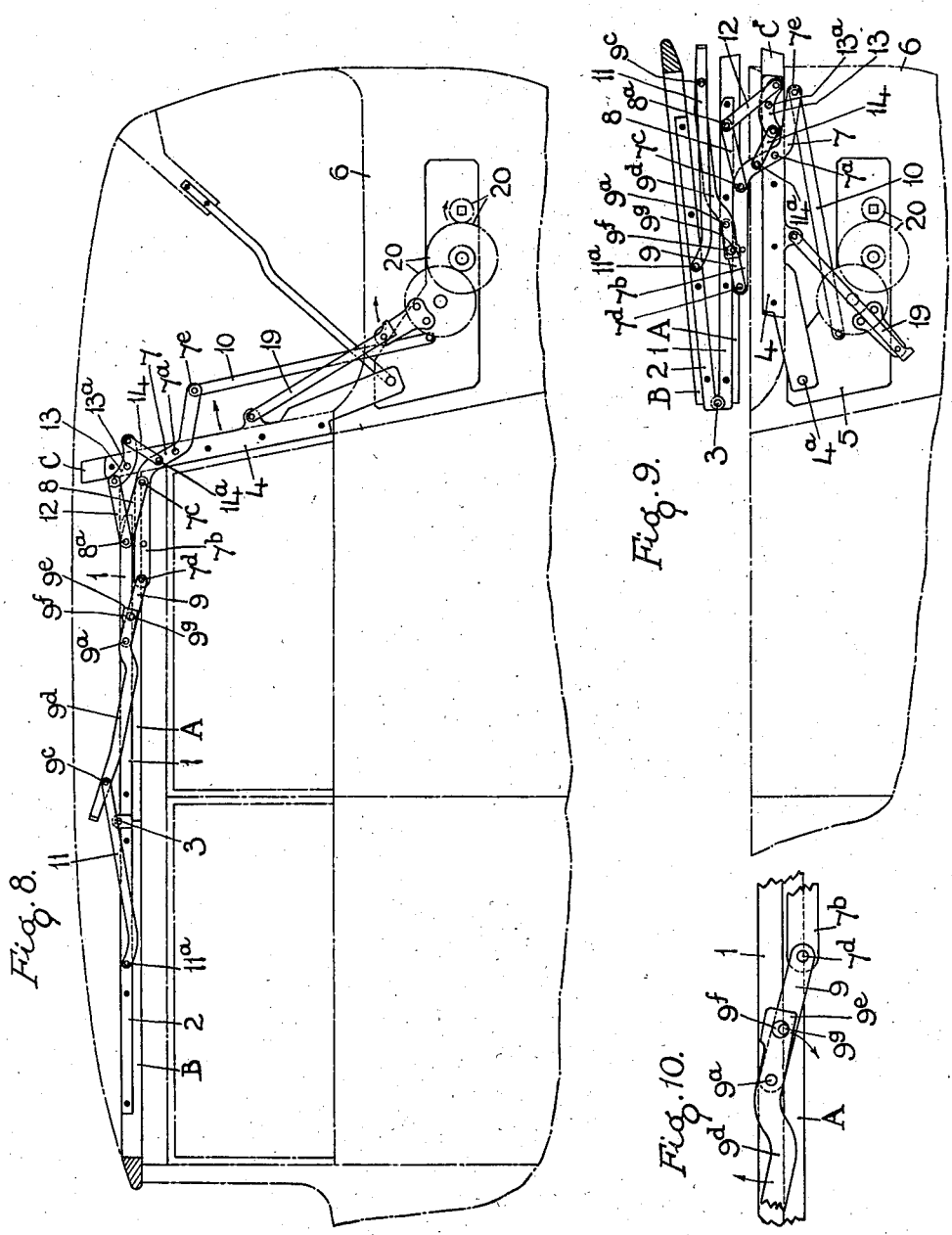

2,066,231

UNITED STATES PATENT OFFICE 2,066,231

HOOD FITTING FOR MOTOR AND OTHER VEHICLES

George Salmons and Arthur Henry Dalby-Balls, Newport Pagnell, England; said Dalby-Balls assignor to Arthur James Lucas Salmons, Newport Pagnell, Buckinghamshire, England Application September 28, 1935, Serial No. 42,694
In Great Britain October 11, 1934

9 Claims. (Cl. 296—116)

This invention relates to hood fittings for motor and other vehicles.

In folding hoods in which the cant rails are formed each in two parts, i. e. a front section and a back section, the front sections being folded over on top of the back sections when the hood is open, it is usual to hingedly connect the front and back sections together end on and to hingedly connect the back section to the back folding pillar. In this method of folding cant rails, the length of the back section is governed by the back door of the vehicle, as the back section cannot extend beyond the door opening when the hood is open, and in consequence, the front section overhangs the back of the body of the vehicle, according to the length of the body, and so restricts the length of body that can be built.

The object of this invention is to overcome or reduce the overhang and at the same time enable the body to be built of any desired length, without too much or any overhang and generally to improve the folding hood fittings.

According to this invention, broadly, the back section of the cant rail or the cant rail fitting is connected by links or equivalent to an arm or equivalent pivotally or hingedly connected to the back folding pillar, and means provided whereby on raising or lowering the back folding pillar, the cant rail or cant rail fitting is caused to move in parallelism with the arm, whereby on lowering the pillar the cant rail or fitting is moved backwards substantially rectilinearly relative to the pillar.

The invention will be clearly understood from the following description aided by the accompanying drawings in which:—

Figure 1 is a side view of one set of fittings closed and applied to a cabriolet type of head in which the cant rails are movable with the fittings.

Figure 2 is a side view showing the fittings partly open;

Figure 3 a similar view with the fittings fully open.

Figures 4, 5, 6 and 7 are detail views.

Figure 8 is a side view of a modified construction of fitting with the hood closed, and, Figure 9 a similar view with the hood open.

Figure 10 a detail view.

Figure 11 is a side view of a construction of fitting suitable for a body having fixed cant rails.

Figure 12 a side view with the hood open, and

Figures 13 and 14 detail views.

In one example of carrying the invention into effect, and as shown in Figures 1 to 7 of the accompanying drawings, the cant rail is formed in two sections, 1, 2, hingedly connected together end on at 3, and the back folding pillar 4 is hingedly connected at $4^a$ to a plate 5 or elbow of the body 6, and on the back folding pillar 4 and at a distance from the top is mounted an arm 7 pivoted thereto at $7^a$, the arm 7 being bent or deflected above its pivotal point $7^a$ and continued forward at the pillar, as a straight portion $7^b$, and the back section 1 of the cant rail is connected to the straight portion $7^b$ of the arm 7 by two links 8, 9, pivotally connected to the rear section 1 of the cant rail at $8^a$, $9^a$ respectively, and to the arm 7 at a distance apart at $7^c$, $7^d$, so that the rear section 1 of the cant rail is held parallel to and can be moved in parallelism with the straight portion $7^b$ of the arm 7. The arm 7 is continued rearwards beyond its pivotal point as at $7^e$, and its end pivotally connected to one end of a rod 10, the other end of the rod 10 being pivotally connected to the elbow 5 of the body 6 at a position behind the pivot point $4^a$ of the rear pillar 4.

The front link 9 is continued upwards beyond its pivotal point $9^a$ on the cant rail section 1, and is pivotally connected at $9^c$ near its free end $9^d$ with a link 11, the other end of which is preferably curved and pivotally connected at $11^a$ to the front section 2 of the cant rail at a distance from its hinged end; the top or free end $9^d$ of the front link 9 carrying a transverse hoop stick.

The rear link 8 connecting the back section 1 of the cant rail to the arm 7, also pivotally carries at $8^a$ one end of a connecting link 12, the other end being slotted as at $12^a$ and pivotally and slidably connected through the slot $12^a$ with one end of a curved link 13 pivotally mounted at $13^a$ on the back folding pillar 4 at a little distance from the top, but above the pivot point $7^a$ of the arm 7, the other end of the curved link 13 being pivotally connected to a link 14, the other end of which is pivotally connected to the arm 7 at $14^a$.

When the hood is up, as in Figure 1, the rear pillar 4 is approximately vertical with the two sections 1, 2 of the cant rail in line and horizontal, in which position the rear end of the back cant rail section 1 abuts against the rear pillar 4. In this position the back section 1 of the cant rail rests on the straight portion $7^b$ of the arm 7 with the two parallel links 8, 9 at an angle forwards from the arm 7, the extension $9^d$ of the front link 9 and the link 11 connecting the free end $9^d$ of the front link 9 with the front section 2 of the cant rail being at an angle to each other and to the cant rail, so that the hoop stick on the end $9^d$ is at a little distance above the cant rail.

To open or lower the hood, the back pillar 4 is moved backwards on its pivot 4ª which action also moves the curved link 13 backwards as it is pivoted at 13ª to the back pillar 4 so that the lower end is held by the link 14, and the curved link 13 is rocked and pulls on the slotted link 12 which raises or pulls back the link 8 and rear section 1 of the cant rail, the arm 7 is also moved back with the rear pillar 4 but is maintained with the straight portion 7ᵇ horizontal by the bar 10. During the opening movement, the rear link 8 is rocked backwards on its pivot 7ᶜ and with it the front link 9, so raising the cant rail section 1 upwards and backwards in parallelism with the straight portion 7ᵇ of the arm 7, the extension 9ᵈ of the front link 9 in moving upwards and backwards also through the link 11 lifts the front section 2 of the cant rail on its hinge 3, so that by the time the back pillar 4 has reached the end of its movement, the back section 1 of the cant rail will be folded down parallel or approximately parallel with the rear pillar 4, and with the two links 8, 9, at an angle rearwards from the straight portion 7ᵇ of the arm 7, and with the back section 1 of the cant rail resting on the straight portion 7ᵇ of the arm 7; the front section 2 of the cant rail being folded over on to the back section 1 of the cant rail, the action being, when folding the rear pillar 4 down, to lift the back section 1 of the cant rail off the straight portion 7ᵇ of the arm 7, at the same time pulling it back, and so enabling a much longer back section of cant rail to be used.

The action of lifting the back section 1 of the cant rail, the amount of lift being governed by the length of the two links 8, 9, to which it is pivoted, enables the hood to be lowered over the back lights or windows without the necessity of first lowering them.

The rod 10 connecting the rear end 7ᵉ of the arm 7 with the elbow 5, ensures that the straight portion 7ᵇ of the arm 7 remains in a horizontal position during the lowering or raising of the hood.

To raise or close the hood a reverse action takes place.

In practice it is preferable to construct the fittings of metal and to employ separate cant rails A, B, and back pillars C which are secured to the fittings as will be well understood.

Where separate cant rails A, B, are employed it is preferred to provide temporary interlocking means between the rear cant rail section and the back pillar C, and which may conveniently consist of a dovetail 15 on the pillar C and a dovetail groove 15ª in the end of the cant rail section B which engage with each other when the hood reaches its closed position.

The slot 12ª in the link 12 is to allow of a better movement of the front section 2 of the cant rail or the front rail for engaging with or releasing from the front pillars or supports.

As it is desirable for compactness and appearance to keep the hoop stick on the end 9ᵈ of the link 9 as low as possible when the hood is raised and to allow of closer folding when lowered, the link 9 is preferably constructed in two sections, as shown in Figures 8 to 10, one section consisting of a link 9 pivotally connecting the straight portion 7ᵇ of the arm 7 to the rear section 1 of the cant rail, and a separate extension 9ᵈ pivotally connected to the link 9 and cant rail section 1 on the pivot point 9ª, such extension link 9ᵈ being provided with a portion 9ᵉ projecting below the pivot point 9ª and connected to the link 9 in such a manner that the extension 9ᵈ may have a limited independent movement in relation to the link 9, such as by providing a comparatively large hole or slot 9ᶠ in the portion 9ᵉ engaging with a pin 9ᵍ on the link 9 so that the extension 9ᵈ can have an independent movement corresponding with the difference in the diameter of the pin and the size of the hole or slot. In this case the slot 12ª in the link 12 may be dispensed with, and the link 12 may be simply pivoted to the curved link 13.

In some cases and especially where no cant rails proper are employed, as in Figures 11 to 14, and such as where a loose front portion of the hood is pulled over by hand after the back portion of the hood has been raised, the rear link 8 connecting the cant rail fitting 1 to the arm 7 is also extended upwards beyond its top pivot 8ª, as at 8ᵇ, and carries a hoop stick, and in this case the slotted link 12 is preferably curved at its non-slotted end and is pivotally connected to the arm 7 between the pivot points 7ᶜ and 8ª.

The straight portion 7ᵇ of the arm 7 may be provided with a bell crank lever 16 pivoted thereon and spring controlled, by a spring 17 to normally urge one end 16ª of the lever upwards, and the back section 1 of the cant rail or the cant rail fitting is provided with rollers 18, 18ª or projections at the pivotal points 8ª, 9ª which engage against the end 18ª of the lever 16 to press same down against the action of the spring 17 when the hood is in the fully open or fully closed position, to prevent rattle.

For clearness of explanation, only one set of fittings has been described, but it will be understood that two sets are employed, one on each side of the body connected by hoop sticks and/or rails, and working in unison.

The rear pillars 4 may be raised or lowered in any suitable manner, and spring means may be provided for assisting in the raising and lowering of the hood, but preferably the rear pillars 4 are provided with pivoted rods 19 which are connected to raising and lowering gear 20; or the pillars 4 are otherwise provided with means operable from raising and lowering gear, such as is described in United States Patent 1,674,573.

What we do claim as our invention and desire to secure by Letters Patent is:—

1. A mechanism of the class described comprising a back pillar, means pivotally mounting said back pillar for movement to and from raised and lowered positions, a cant rail in foldably connected sections adapted to project forwardly with respect to said pillar above the axis of movement of the pillar in the raised position of the latter, a lever pivoted to said pillar between said axis and cant rail sections having a substantially horizontal arm, means connected to said pillar operable to raise and lower said pillar, means connected to said lever to maintain the said arm in substantially horizontal position, linkage connected to said back pillar, adjacent cant rail section and lever, and link mechanism connected to the cant rail sections and said arm operable in cooperation with said linkage and through the lowering of said back pillar to fold the cant rail sections over each other and over the back pillar with the cant rail sections moving bodily away from said axis substantially rectilinearly to reduce overhang of the cant rail sections at the pivoted end of said back pillar.

2. A mechanism of the class described comprising a back pillar, means pivoting said back pillar on a fixed axis for movement to and from raised and lowered positions, a cant rail unconnected at its rear end to said back pillar, said cant rail being in foldably connected sections adapted to project forwardly with respect to said pillar above the said axis in the raised position of the pillar, a lever pivoted to said pillar between said axis and cant rail sections having a substantially horizontal arm, a rod pivoted to said lever at one end and pivoted on a fixed axis at the other end, a rod pivoted to said pillar, means operable to actuate the last mentioned rod to raise and lower said pillar, linkage connected to said back pillar, adjacent cant rail section and lever, and link mechanism connected to the cant rail sections and said arm operable in cooperation with said linkage and through the lowering of said back pillar to fold the cant rail sections over each other and over the back pillar with the cant rail sections moving bodily away from said axis substantially rectilinearly to reduce overhang of the cant rail sections at the pivoted end of said back pillar.

3. A mechanism of the class described comprising a back pillar, means pivoting said back pillar on a fixed axis for movement to and from raised and lowered positions, a cant rail unconnected at its rear end to said back pillar, said cant rail being in foldably connected sections adapted to project forwardly with respect to said pillar above the said axis in the raised position of the pillar, a lever pivoted to said pillar between said axis and cant rail sections having a substantially horizontal arm, a rod pivoted to said lever at the rear of the back pillar, a plate to which said rod is pivoted, said plate having means thereon providing said fixed axis for the pillar, a rod crossing the said rod pivoted to the pillar, means mounted on said plate operable to actuate the last mentioned rod to raise and lower said pillar, linkage connected to said back pillar, adjacent cant rail section and lever, and link mechanism connected to the cant rail sections and said arm operable in cooperation with said linkage and through the lowering of said back pillar to fold the cant rail sections over each other and over the back pillar with the cant rail sections moving bodily away from said axis substantially rectilinearly to reduce overhang of the cant rail sections at the pivoted end of said back pillar.

4. A mechanism of the class described comprising a back pillar, means pivotally mounting said back pillar for movement to and from raised and lowered positions, a cant rail in foldably connected sections adapted to project forwardly with respect to said pillar above the axis of movement of the pillar in the raised position of the latter, a lever pivoted to said pillar between said axis and cant rail sections having a substantially horizontal arm, means connected to said pillar operable to raise and lower said pillar, means connected to said lever to maintain the said arm in substantially horizontal position, a link pivoted to said pillar, a link pivoted to one end of the first link and to said lever, a link pivoted to the other end of the first link and adjacent cant rail section, a link pivoted to the last mentioned cant rail section on the same axis as the third mentioned link and pivoted to said arm, and link mechanism connected to the cant rail sections and said arm operable in cooperation with said linkage and through the lowering of said back pillar to fold the cant rail sections over each other and over the back pillar with the cant rail sections moving bodily away from said axis substantially rectilinearly to reduce overhang of the cant rail sections at the pivoted end of said back pillar.

5. A mechanism according to claim 4 having one of the links provided with an enlarged slot provided about a pivot thereof.

6. A mechanism of the class described comprising a back pillar, means pivoting said back pillar on a fixed axis for movement to and from raised and lowered positions, a cant rail unconnected at its rear end to said back pillar, said cant rail being in foldably connected sections adapted to project forwardly with respect to said pillar above the said axis in the raised position of the pillar, a lever pivoted to said pillar between said axis and cant rail sections having a substantially horizontal arm, a rod pivoted to said lever at one end and pivoted on a fixed axis at the other end, a rod pivoted to said pillar, means operable to actuate the last mentioned rod to raise and lower said pillar, linkage having a link pivoted to said pillar, a link pivoted to one end of the first link and to said lever, a link pivoted to the other end of the first link and adjacent cant rail section, a link pivoted to the last mentioned cant rail section on the same axis as the third mentioned link and pivoted to said arm, and link mechanism connected to the cant rail sections and said arm operable in cooperation with said linkage and through the lowering of said back pillar to fold the cant rail sections over each other and over the back pillar with the cant rail sections moving bodily away from said axis substantially rectilinearly to reduce overhang of the cant rail sections at the pivoted end of said back pillar.

7. A mechanism of the class described comprising a back pillar, means pivotally mounting said back pillar for movement to and from raised and lowered positions, a foldable cant rail adapted to project forwardly with respect to said pillar above the axis of movement of the pillar in the raised position of the latter, a lever pivoted to said pillar between said axis and cant rail having a substantially horizontal arm, said cant rail having forward and rear sections pivoted together, link members pivoted together above the cant rail when extended and pivoted respectively to said sections and one to said arm, means connected to said pillar operable to raise and lower said pillar, means connected to said lever to maintain the said arm in substantially horizontal position, linkage connected to said back pillar, adjacent cant rail section and lever, and link mechanism connected to the cant rail sections and said arm operable in cooperation with said linkage and through the lowering of said back pillar to fold the cant rail sections over each other and over the back pillar with the cant rail sections moving bodily away from said axis substantially rectilinearly to reduce overhang of the cant rail sections at the pivoted end of said back pillar.

8. A mechanism according to claim 1 having a lever element pivoted on said arm, and spring means urging said lever against the adjacent cant rail section to prevent rattling.

9. A mechanism according to claim 1 wherein the rear end of the cant rail is unconnected to said back pillar, and interlocking means between the rear end of the cant rail and the back pillar engageable in the projected position of the cant rail.

GEORGE SALMONS.
ARTHUR HENRY DALBY-BALLS.